(12) United States Patent  (10) Patent No.: US 9,078,341 B2
Suzuki  (45) Date of Patent: Jul. 7, 2015

(54) DISPLAY DEVICE

(71) Applicant: Japan Display Inc., Tokyo (JP)

(72) Inventor: Yuuji Suzuki, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 15 days.

(21) Appl. No.: 13/849,561

(22) Filed: Mar. 25, 2013

(65) Prior Publication Data

US 2013/0300975 A1 Nov. 14, 2013

(30) Foreign Application Priority Data

May 9, 2012 (JP) .................................. 2012-107691

(51) Int. Cl.
*G02F 1/1333* (2006.01)
*H05K 5/00* (2006.01)
*H05B 33/02* (2006.01)
*G02B 1/10* (2015.01)

(52) U.S. Cl.
CPC ........ *H05K 5/0017* (2013.01); *G02F 1/133308* (2013.01); *H05B 33/02* (2013.01); *G02B 1/105* (2013.01)

(58) Field of Classification Search
USPC .......................................................... 349/58
See application file for complete search history.

(56) References Cited

U.S. PATENT DOCUMENTS

2007/0065091 A1* 3/2007 Hinata et al. .................. 385/147
2009/0002607 A1 1/2009 Kubota et al.
2009/0011197 A1* 1/2009 Matsuhira ..................... 428/192

FOREIGN PATENT DOCUMENTS

JP 2009-8973 1/2009

* cited by examiner

*Primary Examiner* — Lucy Chien
(74) *Attorney, Agent, or Firm* — Lowe Hauptman & Ham, LLP

(57) ABSTRACT

An upper frame covers a periphery of a liquid crystal display panel, and a cover plate is bonded onto the upper frame and an upper polarizing plate of the liquid crystal display panel. A step is formed on the cover plate in a portion where the upper frame is bonded to the cover plate. This can reduce a thickness of resin between the upper polarizing plate and the cover plate, thereby reducing an extrusion of the resin in between the cover plate and the upper frame. Thus, a chamfer on a lower side of the cover plate can be reduced in size, and stray light from the lower side of the cover plate can be prevented. This can prevent a white line around a screen.

5 Claims, 6 Drawing Sheets

DISPLAY DEVICE

CLAIM OF PRIORITY

The present application claims priority from Japanese Patent Application JP 2012-107691 filed on May 9, 2012, the content of which is hereby incorporated by reference into this application.

BACKGROUND OF THE INVENTION

1. Field of the Invention

The present invention relates to a display device, and specifically to a display device inhibiting a white line that may occur in a periphery of a display area in a configuration where a frame and a front window (a cover plate) are arranged on a display panel.

2. Background Art

A liquid crystal display device is provided with a TFT substrate including a pixel electrode and a thin film transistor (TFT) in a matrix form and an opposing substrate opposing the TFT substrate and formed thereon with a color filter or the like in a position corresponding to the pixel electrode of the TFT substrate, and liquid crystal is sandwiched between the TFT substrate and the opposing substrate. The device forms an image by controlling light transmission of a liquid crystal molecule with respect to each pixel.

For such a liquid crystal display device, there is a demand for reducing an external size of the set while retaining a certain size of a screen as well as for reducing a thickness of the liquid crystal display panel. In order to reduce the thickness of the liquid crystal display panel, after manufacturing the liquid crystal display panel, an outer side of the liquid crystal display panel is ground to make it thinner.

A glass substrate constituting the liquid crystal display panel, such as the TFT substrate including the pixel electrode, TFT, and the like formed thereon and the color filter substrate, are standardized to the thickness of, for example, 0.5 mm or 0.7 mm. It is difficult to obtain glass substrates other than such standardized ones in the market. Furthermore, a very thin glass substrate may cause a problem of mechanical strength, deflection, and the like during its manufacturing process, resulting in a reduced production yield. Therefore, the outer face of the liquid crystal display panel is ground to make it thinner after forming the liquid crystal display panel using such a standardized glass substrate.

Thinning the liquid crystal display panel may give rise to the problem of the mechanical strength. When a mechanical pressure is applied to a display surface of the liquid crystal display panel, it may break. In order to avoid this, a front window formed of glass or the like is bonded to a front face of the liquid crystal display panel using an adhesive material. Such a liquid crystal display device is described in, for example, Japanese Unexamined Patent Publication No. 2009-008973.

SUMMARY OF THE INVENTION

The liquid crystal display panel requires a backlight because it does not emit light by itself. Because it is difficult to converge the light from the backlight onto a display area alone, the light irradiated on the periphery of the display area is shielded by various means. However, it is difficult to completely shield such stray light. With the liquid crystal display device using the front window, such stray light entering through a side face of the front window from the backlight and the like has become problematic.

FIG. 7 is a cross-sectional view showing a vicinity of a display portion of a liquid crystal display device using a front window 10. In FIG. 7, a liquid crystal display panel 2 includes a TFT substrate 100, an opposing substrate 200, a lower polarizing plate 110, and an upper polarizing plate 210. The front window 10 is bonded onto the upper polarizing plate 210 with an adhesive material 50 curable by irradiation of an ultraviolet ray (hereinafter, UV adhesive material). Black light-blocking printing 12 is applied around the front window 10. However, such light-blocking printing 12 alone cannot block the stray light from the backlight or the like via the front window 10, allowing the light to enter the display area through the periphery of the front window 10, resulting in degradation of contrast.

In order to avoid this, as shown in FIG. 7, an upper frame 30 formed of metal is arranged in the periphery of the liquid crystal display panel 2 to shield the light from the backlight by a flange of the upper frame 30. Because the upper frame 30 is intended to shield the light, its thickness may be as small as about 0.15 mm and its material may be, for example, SUS.

An inside of the flange of the upper frame 30 and the opposing substrate 200 of the liquid crystal display panel 2 are bonded together by a double-sided adhesive tape 60. The front window 10 is bonded to the liquid crystal display panel 2 and the upper frame 30, and their entirety is installed in a housing 20 such as a DSC (Digital Still Camera) or the like. The housing 20 and the upper frame 30 are bonded together by the double-sided adhesive tape 60.

With the configuration shown in FIG. 7, the front window 10 is bonded to the upper polarizing plate 210 of the liquid crystal display panel 2 and the upper frame 30 by the UV adhesive material 50. Due to the presence of the upper frame 30, a thickness t1 of the adhesive material 50 present between the upper polarizing plate 210 and the front window 10 is larger than a thickness t2 of the adhesive material 50 between the front window 10 and the upper frame 30.

With such a configuration, when the front window 10 is bonded via the adhesive material 50, the front window 10 and the upper frame 30 come into contact with each other first, and therefore a distance between the upper polarizing plate 210 of the liquid crystal display panel 2 and the front window 10 is determined by the distance between the upper frame 210 and the front window 10. Thus, an adhesive material layer 50 as thick as, for example, 60 μm is formed between the front window 10 and the upper polarizing plate 210.

If such a thick adhesive material layer 50 is formed, it means that a large amount of the UV material 50 is used. To use a large amount of the UV adhesive material 50, the UV adhesive material 50 must be applied to both sides of the front window 10 and the liquid crystal display panel 2 for bonding, which requires not only a high material cost but also a high production cost. Furthermore, the large amount of the adhesive material 50 may cause more stress due to cure shrinkage of the UV adhesive material 50, leading to a warpage problem of the opposing substrate 200 in the liquid crystal display panel 2. Moreover, a small thickness of the adhesive material 50 may cause another problem that a bubble in the adhesive material layer 50 can hardly escape.

Another problem with the liquid crystal display device equipped with the front window using the upper frame 30 in FIG. 7 is a light leak from a chamfered portion of the front window 10. The front window 10 needs to be chamfered because it is made of glass. It is difficult to apply the black light-blocking printing 12 to the chamfered portion.

In FIG. 7, the stray light from the unshown backlight arranged on a back face of the liquid crystal display panel 2 reaches the chamfered portion of the front window 10 through the periphery of the liquid crystal display panel 2 and the UV adhesive material 50. There is a space in the chamfered portion, and the light coming into the space enters the front window 10 through the chamfered portion and then reaches the display area. This area corresponds to the chamfered area denoted by 13 in FIG. 7. Although FIG. 7 is a cross-sectional view, because the chamfered area 13 is formed along an entire circumference of the front window, the stray light from the chamfered area 13 causes a phenomenon that a white line is visible around the display area. The white line must be prevented because it degrades the visual quality.

Because the white line occurs in the chamfered portion 13, an amount of the chamfer should only be reduced. Although the size of the chamfer on the front surface of the front window 10 is specified by a customer, the chamfer on the back face of the front window 10 causing the white line can be determined by a liquid crystal display panel manufacturer.

FIG. 8 is a cross-sectional view of the liquid crystal display device 2 with the chamfer of the front window 10 reduced in size. It has the same configuration as shown in FIG. 7 except that the chamfer of the front window 10 is smaller, and therefore the similar description is omitted here. A problem with the configuration shown in FIG. 8 is that the smaller chamfer causes more extrusion of the UV adhesive material 50. As shown in FIG. 8, due to the large amount of the UV adhesive material 50 between the upper polarizing plate 210 and the front window 10, it is difficult to control the amount of the adhesive material 50.

With the increased extrusion of the UV adhesive material 50, when the liquid crystal display device is installed in the housing 20, an inner end of the housing 20 abuts the extruded adhesive material 50, which makes it difficult to correctly set the liquid crystal display panel 2 in the housing 20. An alignment of the liquid crystal display panel 2 and the housing 20 is generally performed between the front window 10 and the inner end of the housing 20, and therefore it would be a serious problem if the inner end of the housing 20 and the side face of the front window 10 cannot be bonded together with a predetermined accuracy due to the extruded adhesive material 50.

An object of the present invention is, as described above, to prevent the phenomenon that the thickness of the adhesive material 50 between the liquid crystal display panel 2 and the front window 10 is increased and the occurrence of the white line around the display area due to the stray light from the side of the front window 10, in the liquid crystal display device employing both the upper frame 30 and the front window 10.

The present invention seeks to overcome the above problems, and some of its specific means are described below.

(1) A display device including an upper polarizing plate applied onto a display panel, an upper frame covering a periphery of the display panel, and a cover plate (a front window) covering a display surface of the display panel and attached onto the upper frame and the upper polarizing plate by an adhesive material, wherein the cover plate has a step with its thickness reduced in its periphery, and the upper frame is bonded to cover plate at the step.

(2) The display device according to (1), wherein light-blocking printing is applied to the step of the cover plate, and a thickness t1 of the adhesive material between the cover plate and the upper polarizing plate is smaller than a thickness t2 of the adhesive material between the upper frame and the step of the cover plate.

(3) The display device according to (1), wherein an inner end of the step of the cover plate is located more inward than an end of the upper polarizing plate and more outward than an end of a display area of the display panel.

(4) The display device according to (2), wherein the display panel is a liquid crystal display panel further including a lower polarizing plate, the adhesive material is a UV adhesive material, and a backlight is arranged on a back face of the liquid crystal display panel.

(5) The display device according to (2), wherein the display panel is an organic EL display panel.

According to the present invention, because the thickness of the adhesive material between the front window and the display panel can be smaller than the thickness of the adhesive material between the upper fame covering the periphery of the display panel and the front window, the extrusion of the adhesive material can be reduced. Thus, there is no need of increasing the size of the lower chamfer of the front window, and the white line around the screen due to the stray light from the lower chamfer of the front window can be prevented.

Furthermore, because the thickness of the adhesive material between the display panel and the front window can be reduced, deformation of the substrate due to the cure shrinkage can be prevented.

Moreover, because the thickness of the adhesive material between the display panel and the front window can be reduced, the material cost can be reduced and workability can be improved. In addition, the bubble in the adhesive material can easily escape to the outside.

DESCRIPTION OF THE PREFERRED EMBODIMENTS

Details of the present invention will be described below with reference to embodiments.

First Embodiment

Figure 1:
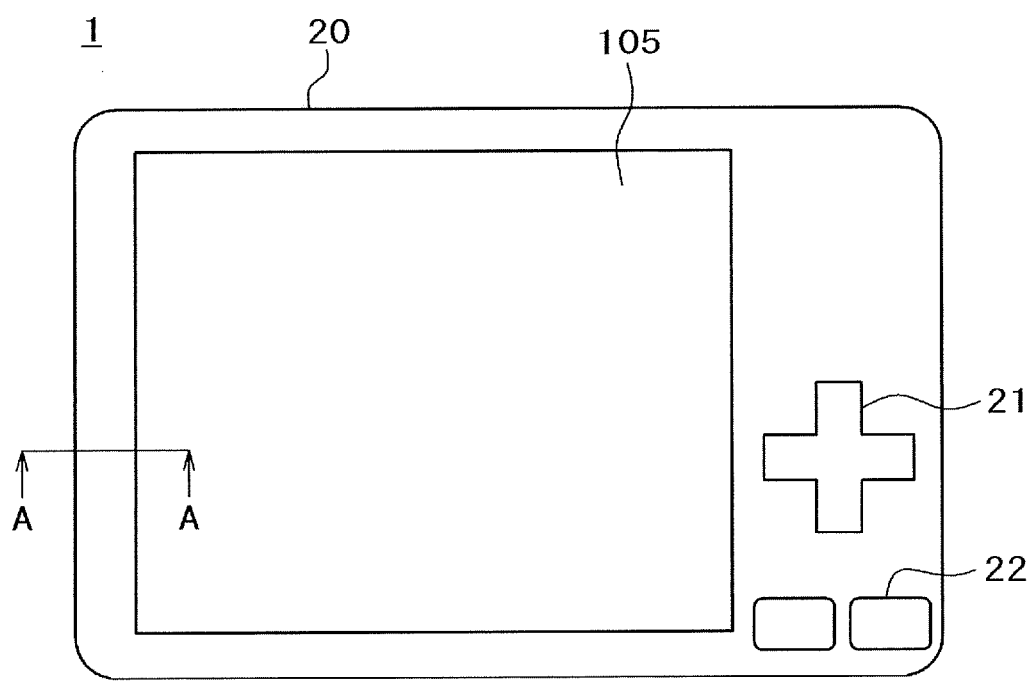
FIG. 1 is a plan view of a liquid crystal display device to which the present invention can be applied.

FIG. 1 is a plan view of a DSC 1 as an example to which the present invention can be applied. It is needless to say that the present invention can be applied not only to the DSC 1 but also to other displays. In FIG. 1, a control button 21, a switch button 22, and the like are arranged on the right side of a display area 105. Because the DSC 1 has an increased number of pixels and a high image quality is required, it is required to exhibit a high contrast even in the periphery of the display area 105.

Figure 2:
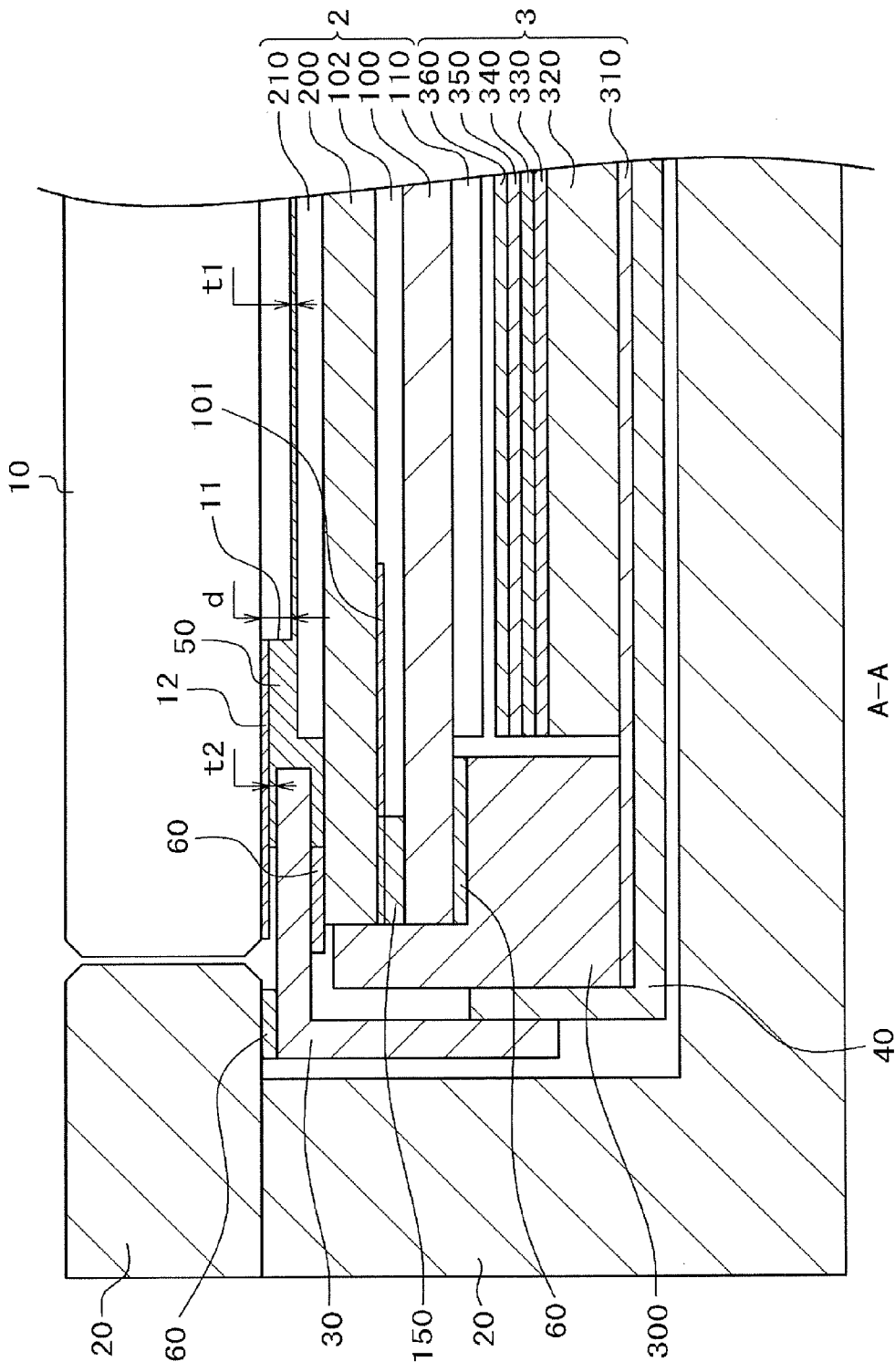
FIG. 2 is an A-A cross-sectional view of FIG. 1.

FIG. 2 is an A-A cross-sectional view of FIG. 1 showing a feature of the present invention. In FIG. 2, a liquid crystal display panel 2 has a configuration described below. Namely, a liquid crystal layer 102 is sandwiched between a TFT substrate 100 including a TFT and a pixel electrode arranged in a matrix form and an opposing substrate 200 formed thereon with a color filter and the like, a lower polarizing plate 110 is bonded to a lower side of the TFT substrate 100, and an upper polarizing plate 210 is bonded to an upper side of the opposing substrate 200. The liquid crystal layer is sealed by a seal material 150. A black matrix 101 is formed in the periphery of the opposing substrate 200 and the black matrix 101 defines the display area 105. The liquid crystal display panel 2 is placed on a mold 300 via a double-sided adhesive tape 60.

A backlight 3 is placed on a back face of the liquid crystal display panel 2. In FIG. 2, the backlight 3 includes, from the lower side, a reflective sheet 310, a light guide plate 320, a lower diffusion sheet 330, a lower prism sheet 340, an upper prism sheet 350, an upper diffusion sheet 360, and a light source such as an LED, that is not shown. The backlight 3 is housed in the mold 300. The backlight 3 including the mold 300 is covered by a lower frame 40.

A front window 10 (a cover plate) is applied onto the liquid crystal display panel 2 by a UV adhesive material 50. Furthermore, an upper frame 30 is applied onto the opposing substrate 200 of the liquid crystal display panel 2 via the double-sided adhesive tape 60. A step 11 is formed on the front window 10 arranged on the liquid crystal display panel 2, which is the feature of the configuration of the present invention.

In FIG. 2, black light-blocking printing 12 is formed on the inside of the step 11 of the front window 10. As shown in FIG. 2, because the step 11 is formed around the front window 10, a thickness t1 of the adhesive material 50 between the front window 10 and the upper polarizing plate 210 of the liquid crystal display panel 2 is smaller than a thickness t2 of the adhesive material 50 between the black light-blocking printing 12 formed on the inside of the step 11 of the front window 10 and the upper frame 30. How much to make t2 larger than t1 can be designed according to the depth of the step 11 of the front window 10.

In other words, assuming the opposing substrate 200 of the liquid crystal display panel 2 as a reference plane and the depth of the step as d, then thickness of the double-sided adhesive material 60+thickness of the upper frame 30+t2+thickness of the black light-blocking printing 12=thickness of the upper polarizing plate 210+t1+d. In FIG. 2, assuming the thickness of the double-sided adhesive tape 60 as 30 μm, the thickness of the upper frame 30 as 150 μm, the thickness of the black light-blocking printing 12 as 10 μm, and the thickness of the upper polarizing plate 210 as 170 μm, then 190 μm+t2=170 μm+t1+d. Assuming t1=30 μm, then t2=d+10 μm. Thus, d should be no less than 20 μm to make t2 no less than 30 μm. That is, it is possible to benefit from an advantage of the present invention by forming a small step 11 around the front window 10. The step 11 can be formed by mechanically or chemically grinding a portion of the front window 10 in which the black light-blocking printing 12 is formed. In this case, the front window 10 is formed integrally with the step. As another possibility, the step 11 can be formed by forming a light-transmissive film on the front window in an area desired to achieve the thickness t1 of the adhesive material. In this case, the step is formed from a material different from that of the front window on a surface of the front window 10 on the side of the display panel.

A first feature of the present invention is that the total amount of the adhesive material 50 to be used is small due to the small thickness t1 of the adhesive material 50 between the front window 10 and the upper polarizing plate 210. The small amount of the adhesive material 50 to be used means a small error of the amount of the adhesive material 50 to be used, also meaning that the extrusion of the adhesive material 50 at the end of the front window 10 can be eliminated by controlling the amount of the adhesive material 50 to be used.

Namely, in FIG. 2, despite the small chamfer of the front window 10, the adhesive material 50 does not extrude from the end of the front window 10. The small chamfer of the front window 10 can eliminate the problem that the stray light may enter the display area through the chamfered portion. Thus, the occurrence of the white line around the display area can be prevented.

Furthermore, the material cost of the adhesive material 50 can be saved because of the small amount of the adhesive material 50 to be used, and the manufacturing process can also be reduced because the adhesive material 50 may be applied only to either side of the front window 10 or the liquid crystal display panel 2.

Moreover, an yield reduction due to the bubble in the adhesive material 50 can be inhibited since the bubble in the adhesive material 50 can be easily moved to the periphery because the thickness of the adhesive material 50 between the front window 10 and the liquid crystal display panel 2 is smaller than the thickness of the adhesive material 50 around the front window 10. Furthermore, because the adhesive material layer 50 between the liquid crystal display panel 2 and the front window 10 is very thin, the stress caused by the cure shrinkage of the adhesive material 50 is reduced accordingly, thereby preventing deformation of the opposing substrate 200.

Figure 3:
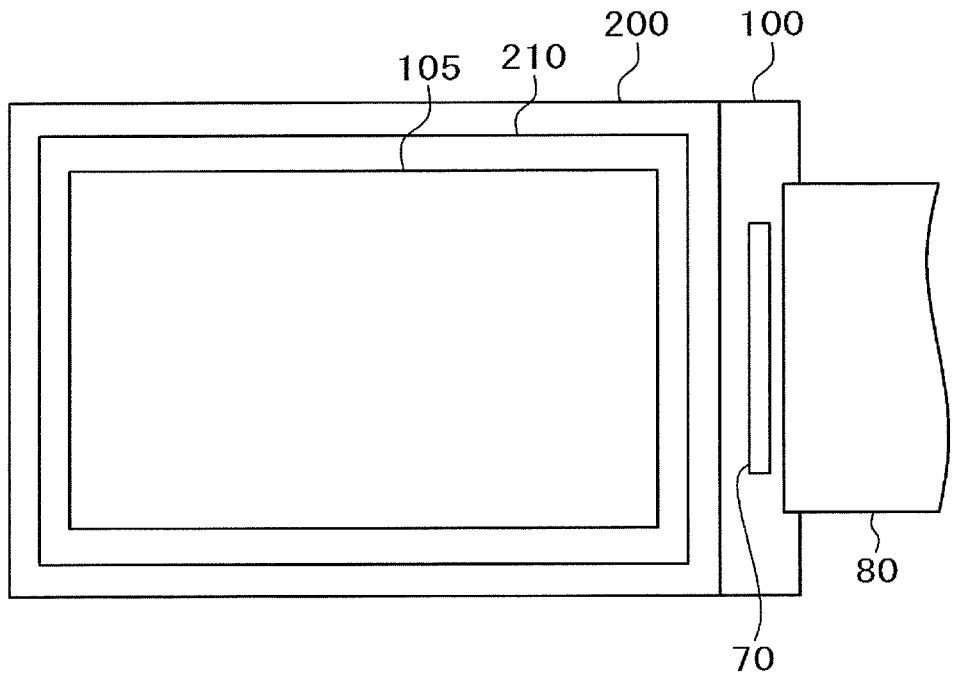
FIG. 3 is a plan view of a liquid crystal display panel.
Figure 4:
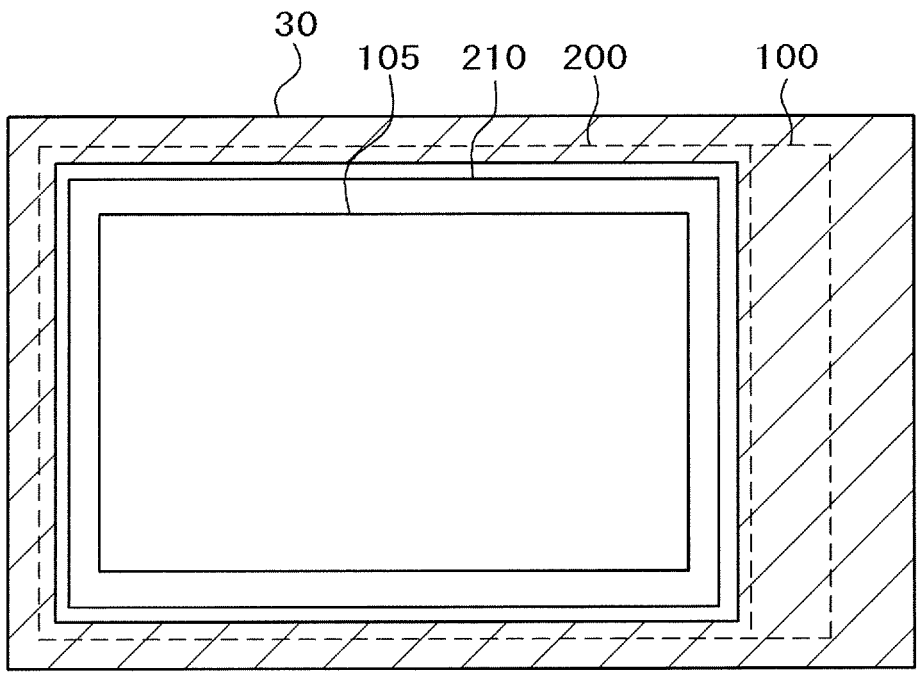
FIG. 4 is a plan view with the liquid crystal display panel covered by an upper frame.
Figure 5:
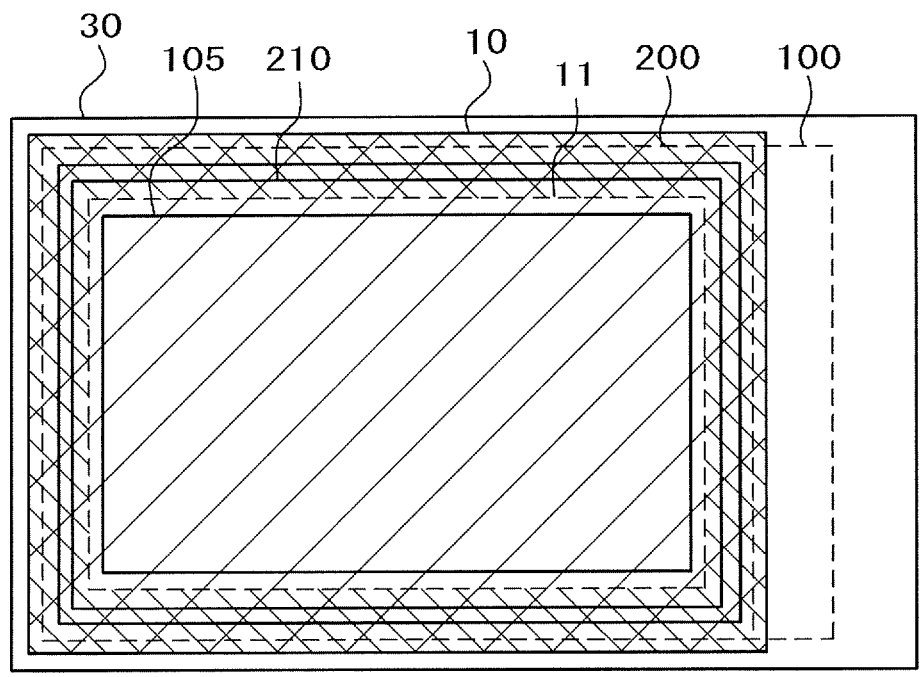
FIG. 5 is a plan view with the liquid crystal display panel and the upper frame covered by a front window.

FIGS. 3 to 5 are plan views illustrating a process of applying the front window 10 to the liquid crystal display panel 2 via the upper frame 30. In FIG. 3, the opposing substrate 200 is applied to the TFT substrate 100 using an unshown seal material. The TFT substrate 100 is larger than the opposing substrate 200, an IC driver 70 is mounted on a portion where the TFT substrate 100 is not overlapped, and a flexible wiring substrate 80 is also attached thereto. An upper polarizing plate 210 is applied to the opposing substrate 200, and the display area 105 is formed slightly more inward than the upper polarizing plate 210.

FIG. 4 is a plan view showing a state where the upper frame 30 is arranged on the liquid crystal display panel 2 shown in FIG. 3. An upper face of the liquid crystal display panel 2 is covered by a flange of the upper frame 30, which is shown hatched, and only the display area 105 and the upper polarizing plate 210 are shown in the plan view. An opening in the upper frame 30 is formed slightly larger than the upper polarizing plate 210. The liquid crystal display panel 2 and the upper frame 30 are bonded by the unshown double-sided adhesive tape 60. A dotted line in FIG. 4 indicates a position of the liquid crystal display panel 2. In FIG. 4, the flexible wiring substrate 80 is folded downward with respect to a plane of paper.

FIG. 5 is a plan view showing a state in which the front window 10 is applied to the configuration in FIG. 4 using the UV adhesive material 50. The front window 10 is shown hatched. The step 11 of the front window 10 is shown hatched in a different direction. In FIG. 5, the inside of the step 11 of the front window 10 indicated by a dotted line is located more outward than the display area 105 and more inward than the upper polarizing plate 210. An external dimension of the front window 10 is slightly smaller than the external dimension of the upper frame 30.

After attaching the upper frame 30 and applying the front window 10 to the liquid crystal display panel 2 in this manner, the backlight housed in the mold 300 as shown in FIG. 2 is inserted from the back face of the liquid crystal display panel 2. The liquid crystal display panel 2 and the mold 300 are, as shown in FIG. 2, bonded by the double-sided adhesive tape 60. After that, a lower portion of the liquid crystal display device is covered by the lower frame 40.

Second Embodiment

Although the present invention was described in association with an application to the liquid crystal display device in the first embodiment, the present invention is not limited to the liquid crystal display device but can also be applied to an organic EL display device. The organic EL display device has a light emitting display area, and therefore it does not require a backlight. However, even in the case of such a light emitting device, there can be stray light in the front window.

Figure 6:
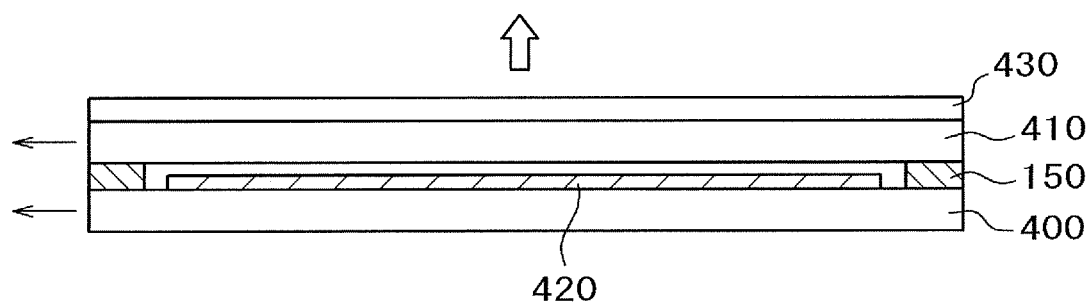
FIG. 6 is a cross-sectional view of an organic EL display panel.
Figure 7:
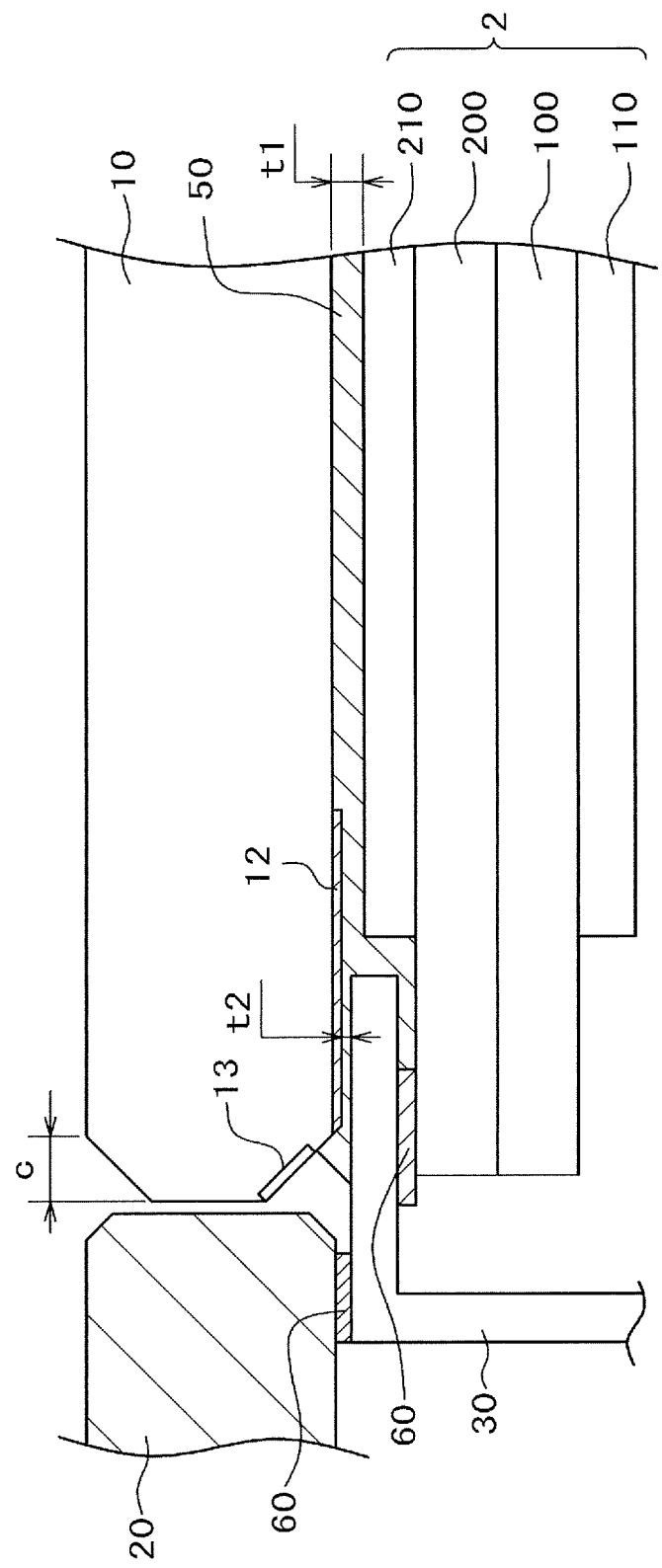
FIG. 7 is a cross-sectional view showing a problem with a prior art example.
Figure 8:
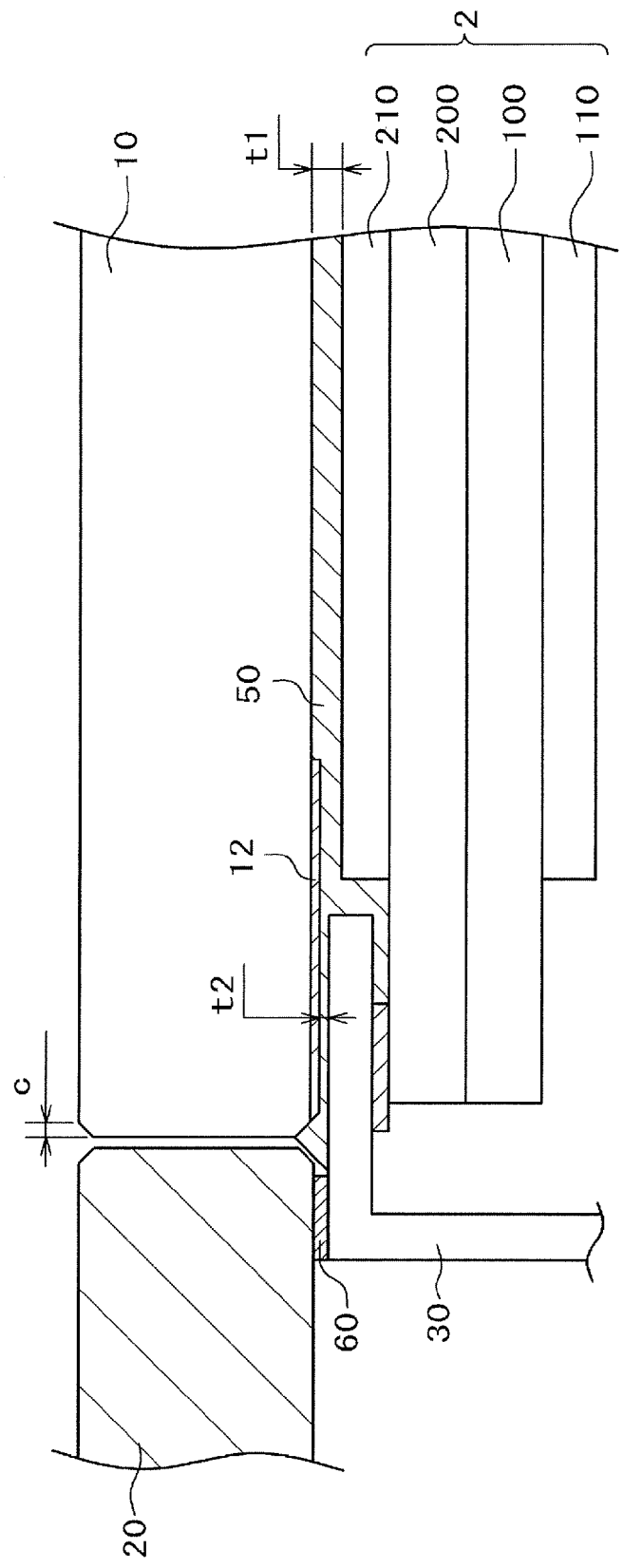
FIG. 8 is a cross-sectional view showing a problem with another prior art example.

FIG. 6 is a schematic cross-sectional view of an organic EL display panel 4. In FIG. 6, an organic EL layer 420 is formed on an element substrate 400, and an image is formed by the organic EL layer 420 emitting light upon receipt of a video signal. Because brightness of the organic EL layer 420 may be deteriorated by moisture, it is generally covered by a sealing substrate 410 made of glass to prevent the moisture in an atmosphere from entering. The element substrate 400 and the sealing substrate 410 are bonded together by the seal material 150.

FIG. 6 shows the top-emission organic EL display panel 4, with which the light from the organic EL layer 420 is extracted from the side of the sealing substrate 410, as indicated by a white arrow. A circularly polarizing plate 430 is applied on the side of the sealing substrate 410 for an antireflection purpose. The circularly polarizing plate 430 corresponds to the upper polarizing plate 210 in the liquid crystal display device, in a mechanical sense. However, the light from the organic EL layer 420 emits not only from a principal surface of the sealing substrate 410 but also in a lateral direction, as indicated by lateral arrows in FIG. 6, while repeating a total reflection inside the element substrate 400 or the sealing substrate 410. If this light is developed into the stray light and directed to the display screen side after reflecting on an inner face of the housing or the like, it degrades the contrast and the image quality.

In order to prevent such a phenomenon, as shown in FIG. 2 of the liquid crystal display device, an arrangement of the upper frame 30 surrounding the organic EL display panel 4 should be effective. Furthermore, there is also a desire to reduce the thickness of the display device with the organic EL display panel 4, as with the liquid crystal display device. For this purpose, it is required to reduce the thickness of the element substrate 400 and the sealing substrate 410, which may cause a problem of mechanical strength of the organic EL display panel 4, as with the case of the liquid crystal display device.

Accordingly, the front window 10 is also used on the organic EL display panel 4. Because the front window 10 is bonded to the organic EL display panel 4 by the adhesive material, the problems of the thickness of the adhesive material, of the cure shrinkage of the adhesive material, of the stray light from the chamfered portion of the front window 10, and the like are similar to those explained with reference to the liquid crystal display device in FIG. 2. It should be noted that a thermosetting adhesive material may be used as the adhesive material in the organic EL display device.

Accordingly, the present invention described with reference to the liquid crystal display device can be similarly applied to the organic EL display device.

What is claimed is:

1. A display device comprising an upper polarizing plate applied onto a display panel, an upper frame covering a periphery of the display panel, and a cover plate covering a display surface of the display panel and attached onto the upper frame and the upper polarizing plate by an adhesive material,
   wherein the cover plate has a step with its thickness reduced in its periphery, and the upper frame is bonded to the cover plate at the step, and
   wherein a light-blocking printing is applied to the step of the cover plate, and a thickness of the adhesive material between the cover plate and the upper polarizing plate is smaller than a thickness of the adhesive material between the upper frame and the light-blocking printing.

2. The display device according to claim 1, wherein an inner end of the step of the cover plate is located more inward than an end of the upper polarizing plate and more outward than an end of a display area of the display panel.

3. The display device according to claim 1, wherein the display panel is a liquid crystal display panel further including a lower polarizing plate, the adhesive material is a UV adhesive material, and a backlight is arranged on a back face of the liquid crystal display panel.

4. The display device according to claim 1, wherein the display panel is an organic EL display panel.

5. The display device according to claim 1, wherein the cover plate is made of glass.

* * * * *